Nov. 27, 1956   W. A. BARNES   2,772,095
OFFSET GRIP FOR SPLIT DIES AND METHOD OF MAKING SAME
Filed June 30, 1953   2 Sheets-Sheet 1

INVENTOR.
WILLIAM A. BARNES
BY Woodling and Krost
attys

Nov. 27, 1956  W. A. BARNES  2,772,095
OFFSET GRIP FOR SPLIT DIES AND METHOD OF MAKING SAME
Filed June 30, 1953  2 Sheets-Sheet 2

INVENTOR.
WILLIAM A. BARNES
BY Woodling and Krost
attys

United States Patent Office 2,772,095
Patented Nov. 27, 1956

2,772,095

OFFSET GRIP FOR SPLIT DIES AND METHOD OF MAKING SAME

William A. Barnes, Utica, N. Y., assignor to Utica Drop Forge & Tool Corporation, a corporation of New York Application June 30, 1953, Serial No. 365,150

4 Claims. (Cl. 279—57)

This invention relates in general to holding and forming dies of multiple parts adapted to close upon a workpiece holding area, and relates more specifically to split taper dies for gripping a longitudinal workpiece and upsetting the end of the workpiece, such as in the butt welding of two such workpieces by upsetting the two against one another.

An object of this invention is to provide split workpiece holding dies for better gripping of a longitudinal workpiece held thereby without deleterious deforming of the workpiece.

Another object of this invention is to provide a wavering workpiece path through split holding dies to thereby increase the resistance to longitudinal slipping movement of the workpiece being held.

Still another object of this invention is to provide a convenient and inexpensive means for producing an irregular wall surface in a workpiece holding cavity of split holding dies.

Other objects and a fuller understanding of the invention may be had by referring to the following description and claims, taken in conjunction with the accompanying drawings, in which:

Split dies of various types have long been employed for holding workpieces. However, there has recently been developed a process for welding workpieces, such as wires, at a temperature below the normal welding temperature of the workpieces, by forcing properly cleaned and conditioned workpieces together under conditions of confined flow and high pressure to form a solid phase bond of unusual characteristic. In the process of joining the workpieces, there is required a considerable pressure and, consequently, the holding dies must grip the workpieces with an exceptionally strong grip and yet not deleteriously deform the workpieces. The workpiece holding cavity of such split dies have been roughened by an electric needle, and other similar processes, in order to attempt to produce a strong anti-slip grip upon the workpieces.

According to this invention, the dies are formed with lateral recesses which cause the workpiece to assume a wavering path through the dies in order to increase the resistance to longitudinal slippage to a considerable degree.

Figure 1:
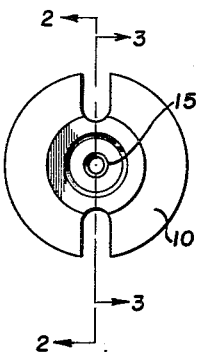
Figure 1 is a front end view of a tapered split die of two parts which embodies features, and is made by the process of this invention.
Figure 2:
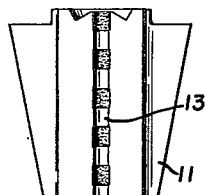
Figure 2 is one die member as viewed from line 2—2 of Figure 1.
Figure 3:
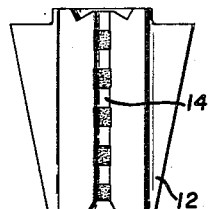
Figure 3 is one die member as viewed from line 3—3 of Figure 1.
Figure 4:
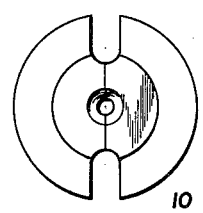
Figure 4 is a back end view of a tapered split die of two parts which embodies features, and is made by the process of this invention.
Figure 5:
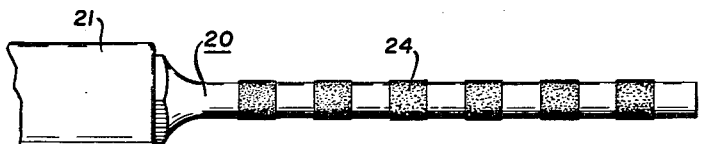
Figure 5 is a side view of a rotatable mandrel having spaced abrasive portions.

In order to illustrate the concept of the invention, the production of the improved work holding cavity of this invention is illustrated in conjunction with a tapered split die 10. The split die 10 comprises a half die 11 and a half die 12 with cooperating surfaces mated together as illustrated in Figures 1 and 4. Half die 11 has a longitudinal surface cavity 13 along the mating surface and half die 12 has a similar cavity 14. The cavities 13 and 14 define a workpiece receiving area through the tapered split die 10.

The face end of split die 10 is provided with upset cavity 15 which serves to confine the flow of workpieces held by the die 10 and cause the solid phase union of the workpieces held by the die 10.

In the process of making the improved work holding area through the die 10 according to the principles of this invention, a cutting device is provided having the general shape of the workpiece to be held in the die and having cutting means in spaced intervals along the surface thereof. One such cutting device is represented by the mandrel 20. Mandrel 20 is provided with a shank end 21 which may be gripped by any convenient type of holding device, whether that holding device be stationary or rotatable. Abrasive sections 24 are spaced along the surface of the mandrel 20 to serve as cutting means. Cutting devices having abrasive portions adhering to a metallic surface are well known and can be readily adapted for the purpose of this invention.

Figure 6:
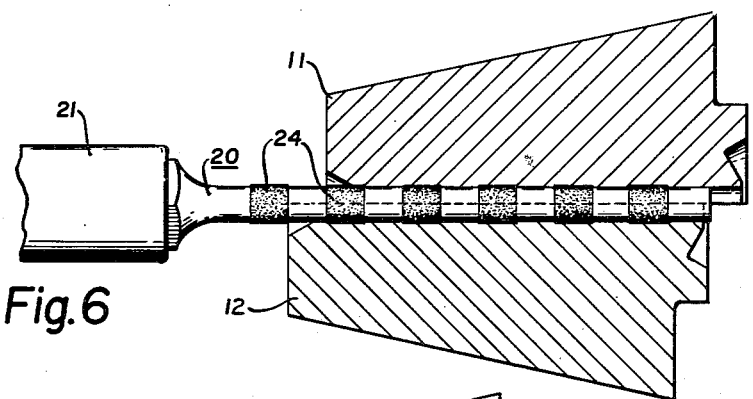
Figure 6 is a sectional view through a split two-piece cone die assembled in a staggered relative longitudinal position upon the mandrel of Figure 5.

In Figure 6 the step of producing lateral recesses is illustrated diagrammatically. The cutting device is placed in the workpiece holding area of the dies and the dies and the cutting device are rotated relative to one another under lateral pressure until lateral grooves are cut in the die member. The die members 11 and 12 may be aligned in the position which they will assume under service conditions, whereupon the holding area defined by the cavities 13 and 14 will have a series of enlarged portions into which the workpiece may swell in order to provide a tight interlocking fit with the split die 10. However, it has been found that by staggering the half dies 11 and 12 substantially as illustrated in Figure 6, a distance substantially equal to the distance between the abrasive section 24, that after the lateral cavities have been cut the half dies can be rematched longitudinally into their proper relative position whereupon the cavities will be alternately spaced with respect to uncut portions of the opposite die member. By this means, the cavities 13 and 14 will define a somewhat meandering or wavering workpiece holding path through the die. Accordingly, it has been found that a workpiece gripped in such a wavering path will have a considerable resistance to longitudinal movement by virtue of its shape with respect to the workpiece area, but that the workpiece will not have been stressed to any considerable degree and, consequently, will not have weakness imposed thereon.

Figure 7:
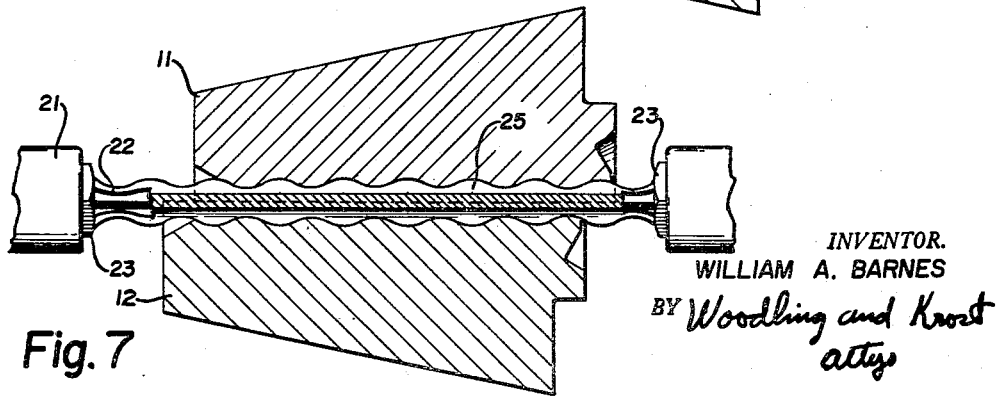
Figure 7 is a sectional view through a split two-piece cone die assembled in a staggered relative longitudinal position upon an alternate type of cutting mandrel.

An alternate mandrel is illustrated in Figure 7 and indicated by the reference character 22. Mandrel 22, having shank ends 23 thereon for convenient holding, is provided with a series of rounded milling teeth sections 25 thereon. The milling teeth will cut radial grooves in the surfaces of half dies 11 and 12, and if the half dies 11 and 12 are originally staggered as indicated in Figure 7, the land areas between the grooves in one die will be opposite from the groove area in the other die when the dies are rematched longitudinally in their working position. Thus, a more rounded wavering or meandering path will be defined through the tapered split die 10. The type of work holding area produced by the mandrel 22 is exceptionally valuable for use with insulated wires which are to be butt welded.

Figure 8:
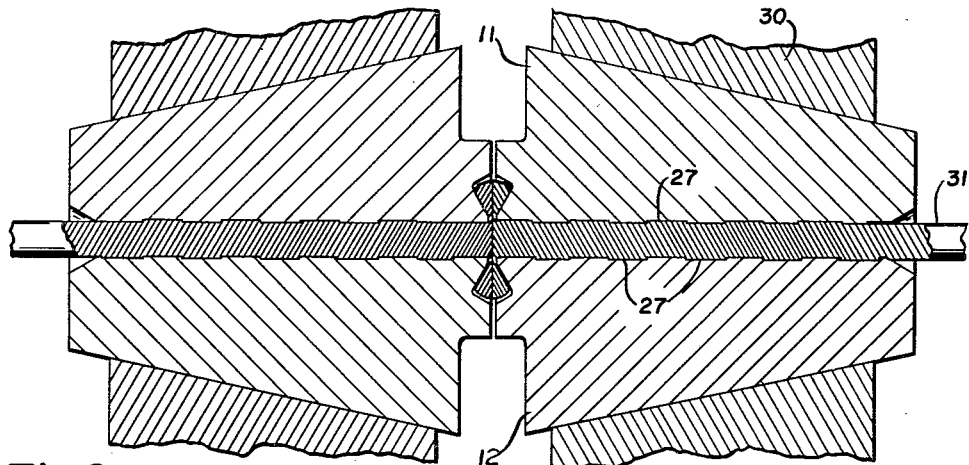
Figure 8 is a sectional view of the dies made with the mandrel of Figure 5 according to this invention in use for butt welding of wires at a temperature less than normal welding temperature.
Figure 9:
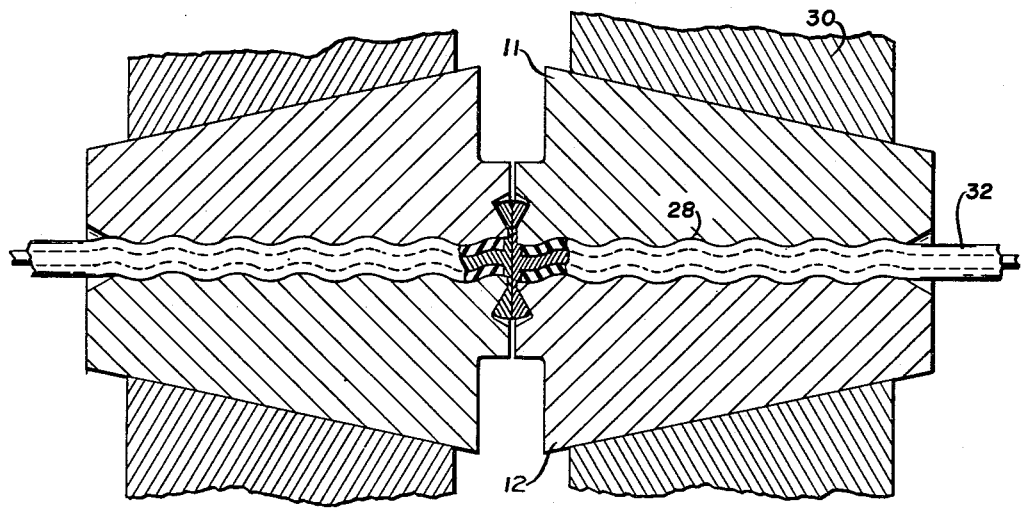
Figure 9 is a sectional view of the dies made with the mandrel of Figure 6 in use for butt welding of wires at a temperature less than normal welding temperature.

Reference to Figures 8 and 9 will illustrate the invention as actually used in butt weld joining of wires under actual service conditions. Holders 30 are provided in a suitable holding and driving tool which will move two tapered split dies 10 along a common longitudinal path toward and away from one another. The holders 30 have tapered sockets into which the tapered split die 10 will fit and wedge. The cavities 13 and 14 are proportioned to produce a tight grip upon a workpiece prior to contacting of the half dies 11 and 12 in order to assure a tight grip upon the workpiece. In Figure 8, a wire 31 without insulation is illustrated as being the member held by the dies 10. In Figure 8 the staggered recesses produced by the mandrel 20 are indicated by the reference character 27. Here it can clearly be seen that the recesses 27 are opposite to the land area remaining between the recesses 27 of the opposite half die member. Thus, the workpiece is pressed by a land area into a recess 27. Because of the offset nature of the workpiece produced by the multiple recess and land areas, the workpiece is caused to grip in the dies with considerably greater resistance to longitudinal movement than could be produced by a straight cavity.

In Figure 9 the workpiece is an insulated wire 32, and here the advantages of the rolling type of meandering path produced by mandrel 22 is clearly apparent. The insulation of wire 32 is not cut or harmfully deformed and yet the resistance to longitudinal movement of the wire 32 through the dies 10 is considerably increased.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. The method of making a workpiece cavity in split holding dies, comprising the steps of providing a plurality of die members cooperating to define a workpiece holding area and laterally compressible upon a workpiece in said area, providing a cutting device having the general shape of a workpiece to be held in said dies and having cutting means at spaced intervals along the surface thereof, placing said dies in a staggered relative position with respect to the normal work holding position thereof, placing the cutting device in said workpiece holding area of the staggered dies, rotating said dies and cutting device relative to one another under lateral pressure until matched lateral grooves are cut in said staggered die members, separating said cutting device from said dies, and placing said dies into working alignment wherein said lateral grooves are mismatched and create a wavering path workpiece holding area.

2. The method of making a workpiece cavity in split holding dies, comprising the steps of, providing a plurality of die members having complementary mating surfaces, forming a longitudinal groove in the mating surface of each die member, said grooves cooperating to define a longitudinal cavity in the mated dies, providing a mandrel having metal cutting surfaces thereon at spaced intervals along the surface thereof, said cutting surfaces adapted to cut separate recesses placing said dies in longitudinally staggered relationship upon said mandrel, and rotating said mandrel and staggered dies relative to one another with a lateral pressure closing said dies upon said mandrel until annular recesses are cut in the walls of said grooves.

3. The method of making a workpiece cavity in split holding dies comprising the steps of, providing a first and second die member having complementary mated surfaces, forming longitudinal grooves in the mating surface of each die member, said grooves cooperating to define a longitudinal cavity through the mated dies, providing a mandrel having a plurality of cutting surface means thereon at spaced intervals along the surface thereof, said cutting surfaces adapted to cut separate recesses placing said dies in longitudinally staggered relationship upon said mandrel, the dies being staggered longitudinally a distance substantially equal to the distance between said cutting surface means, and rotating said mandrel and staggered dies relative to one another with a lateral pressure closing said dies upon said mandrel until annular recesses are cut in the walls of said grooves.

4. Split holding dies for holding a workpiece therein against severe longitudinal forces tending to move the workpiece through the dies, comprising, a plurality of die members having die surfaces cooperating to define a workpiece holding area and said die members being laterally compressible upon a workpiece in said area, said die members having a working alignment position, said die members being relatively shiftable to a staggered relative position, said die surfaces having symmetrical lateral grooves along said work piece holding area while in said staggered relative position, said lateral grooves having land areas therebetween, said land areas being located opposite groove areas while said die members are in said working alignment position.

References Cited in the file of this patent

UNITED STATES PATENTS

| | | |
|---|---|---|
| 1,403,553 | Horn | Jan. 17, 1922 |
| 1,430,385 | Komarek | Sept. 26, 1922 |
| 1,458,906 | Morisette | June 12, 1923 |
| 1,661,367 | Helminiak | Mar. 6, 1928 |
| 1,724,697 | Dobrick | Aug. 13, 1929 |
| 2,137,858 | Schwabacher | Nov. 22, 1938 |
| 2,459,910 | Alvin | Jan. 25, 1949 |